April 17, 1962     D. T. GILMORE     3,029,751
POPPED CORN FORMING MACHINE AND METHOD
Filed Nov. 26, 1958     8 Sheets-Sheet 1

Fig. 1

INVENTOR.
Dale T. Gilmore,
BY Robert R. Lockwood
atty

April 17, 1962

D. T. GILMORE 3,029,751

POPPED CORN FORMING MACHINE AND METHOD

Filed Nov. 26, 1958

INVENTOR.
Dale T. Gilmore,
BY
Robert R. Lockwood
atty

April 17, 1962  D. T. GILMORE  3,029,751
POPPED CORN FORMING MACHINE AND METHOD
Filed Nov. 26, 1958  8 Sheets-Sheet 7

INVENTOR.
Dale T. Gilmore,
BY Robert R. Lockwood
ATTY

United States Patent Office 3,029,751
Patented Apr. 17, 1962

3,029,751
POPPED CORN FORMING MACHINE AND METHOD
Dale T. Gilmore, Springdale, Ark., assignor, by mesne assignments, to Sonneman Products, Incorporated, Fayetteville, Ark., a corporation of Arkansas
Filed Nov. 26, 1958, Ser. No. 776,580
26 Claims. (Cl. 107—16)

This invention relates, generally, to machines for forming objects and it has particular relation to machines for making popped corn balls and the like.

Among the objects of this invention are: To provide a machine for making objects, such as popped corn balls, that is simple and efficient in operation and which can be readily and economically manufactured, installed, and operated; to mix popped corn and an edible binder in such manner that the mixture has little tendency to stick to the walls of the hopper in which the same are mixed or to the dies used for compressing the mixture to the desired shape; to provide a heated space in which the mixing is performed; to feed independently popped corn and a dry edible powdered binder into a mixing hopper; to heat the popped corn before it is fed into the mixing hopper; to form the popped corn coated with the binder as the result of the mixing operation into the desired shape, such as balls; to mix the popped corn and binder by discharging them into an upwardly flowing stream of heated air; to introduce the popped corn and binder separately and batchwise into the upwardly flowing stream of heated air; to introduce the binder below the popped corn in the stream of heated air; to shut off the stream of heated air and allow the mixture to fall into the popped corn ball forming means; to prevent adherence of kernels of popped corn to the walls of the mixing hopper adjacent the bottom discharge opening thereof; and to correlate the introduction of the popped corn and binder into the mixing hopper and the upwardly flowing stream of heated air therein with the operation of the popped corn ball forming means.

Other objects of this invention will, in part, be obvious and in part appear hereinafter.

This invention is disclosed in the embodiments thereof shown in the accompanying drawings and it comprises the features of construction, combination of elements and method of operation which will be exemplified by the constructions hereinafter set forth and the scope of the application of which will be indicated in the appended claims.

For a more complete understanding of the nature and scope of this invention, reference can be had to the following detailed description, taken together with the accompanying drawings, in which.

Figure 1:
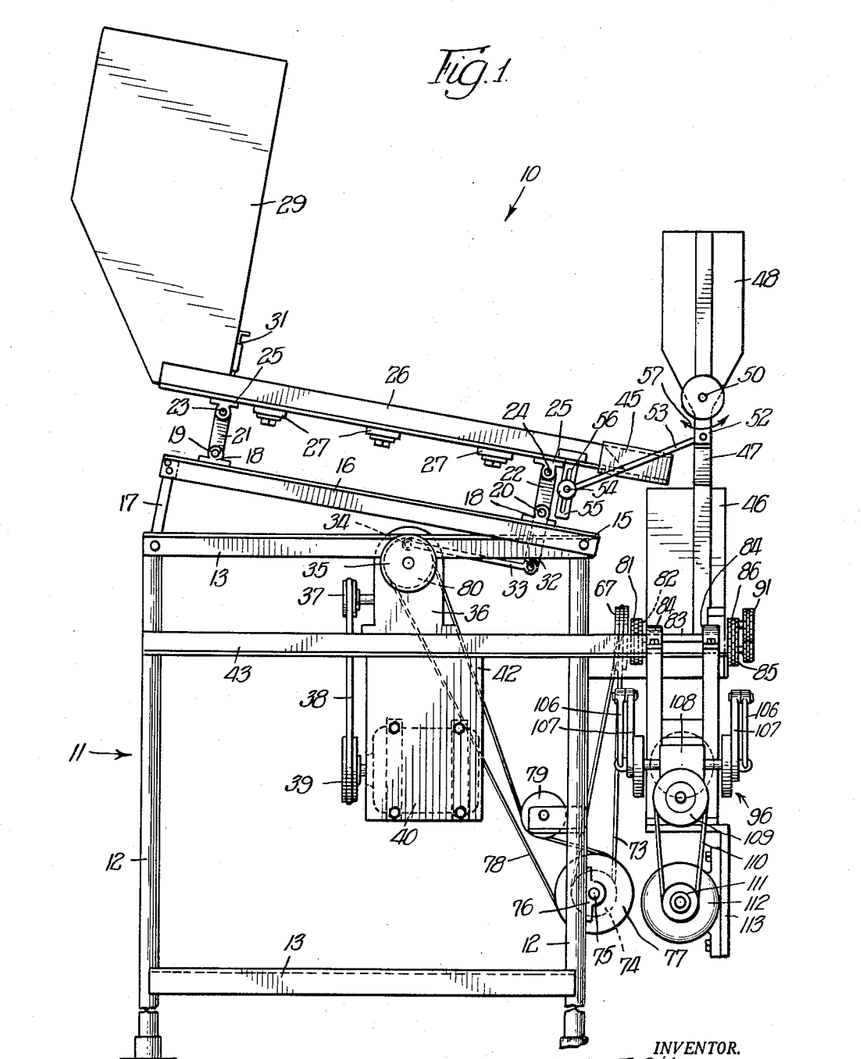
FIGURE 1 is a view, in side elevation, of a popped corn ball making machine in which the present invention is embodied.
Figure 2:
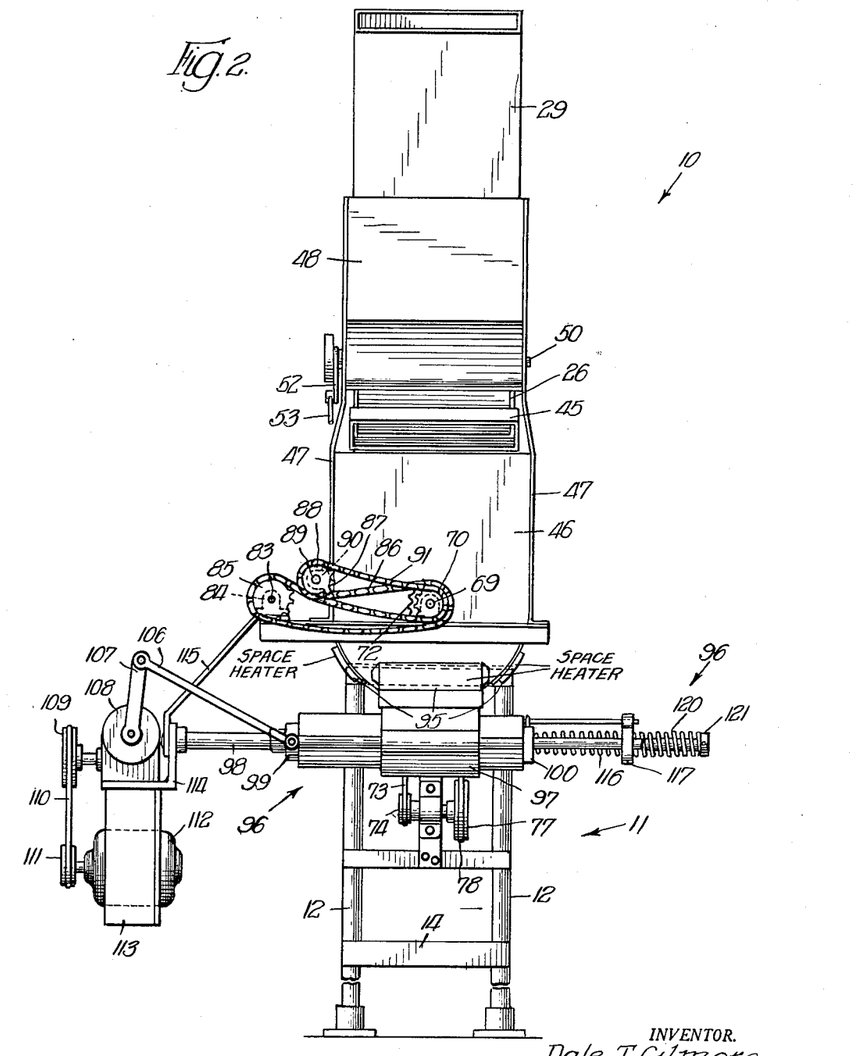
FIGURE 2 is a view, in end elevation, of the machine as shown in FIGURE 1.
Figures 3, 4:
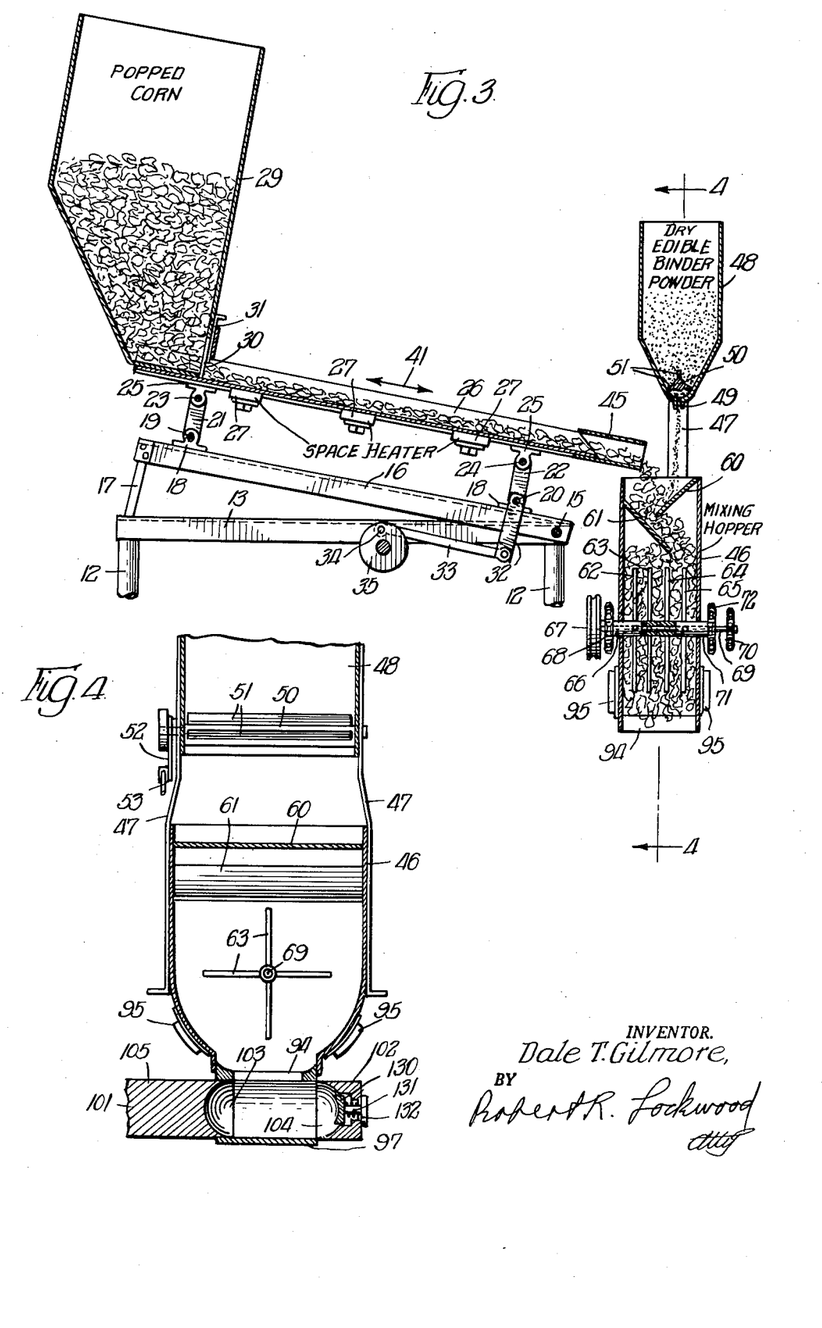
FIGURE 3 is a vertical sectional view through the machine illustrated in FIGURES 1 and 2, only the hoppers and associated parts being shown.
FIGURE 4 is a vertical sectional view taken generally along the line 4—4 of FIGURE 3.

Referring now particularly to FIGURES 1, 2 and 3 of the drawings, it will be observed that the reference character 10 designates, generally, a popped corn ball making machine in which the present invention is embodied. The machine includes a support frame 11 that may be formed of upright members 12 in the form of pipes. Longitudinal angle braces 13 are suitably secured by welding at their ends to the uprights 12 and in like manner transverse angle braces 14 are provided, only one being shown in FIGURE 2. It will be understood that the support frame 11 can take many forms and that the one illustrated is typical of those which can be employed.

Pivoted at 15 to the upper longitudinal braces 13 and at one end is a pair of support angles 16 which are inclined at a slight angle to the longitudinal braces 13 and held in the inclined position by a pair of adjustable brackets 17. Provision is made for adjusting the inclination of the support angles 16 to an angle from zero to about twenty degrees. Bearings 18 are mounted on the upper sides of the support angles 16 near the ends and shafts 19 and 20 are journaled therein. Fastened to the shafts 19 and 20 are pairs of links 21 and 22 which are fastened at their upper ends to shafts 23 and 24 that are journaled in bearings 25 carried by the underside of a chute 26. As will be described hereinafter, the chute 26 is provided for directing the flow of popped corn to be further processed and it, like the support angle 16, is inclined to the horizontal in order to facilitate the flow of the popped corn therethrough.

It is desirable to heat the space within the chute 26 in order that the popped corn will be raised to an elevated temperature for further processing. For this purpose space heaters 27 are provided on the underside of the chute 26 and they are connected to a suitable source of electric current (not shown) to maintain the interior of the chute 26 at the desired temperature as will be understood readily.

The popped corn to be processed is deposited in a popped cornhopper 29 which is mounted at one end of the inclined chute 26 and is provided with an opening 30 that is arranged to be closed by a gate 31. It will be understood that the popped corn in the hopper 29 flows through the opening 30 when the gate 31 is opened, as shown in FIGURE 3, into the chute 26 where it is heated by the space heaters 27 as it flows downwardly therethrough.

It is desirable to further facilitate the flow of the popped corn through the chute 26 by vibrating or oscillating it together with the popped corn hopper 29. For this purpose an arm 32 is fastened to the shaft 20 and its lower end is connected by a link 33 to a pin 34 which is carried eccentrically by a wheel 35. The wheel 35 is driven through a gear reducer 36, FIGURE 1, by means of a pulley 37. A belt 38 extends over the pulley 37 and also a drive pulley 39 of a motor 40. Thus, when the motor 40 is operating, the wheel 35 is rotated and the chute 26 and hopper 29 are oscillated as indicated at 41 in FIGURE 3 through an extent which may be of an order of 1½" and at a rate of the order of 90 to 160 oscillations per minute.

The motor 40 is suitably mounted on the frame 11. For example, it can be mounted on a vertical support plate 42 which is fastened to one of a pair of longitudinal frame angles 43 which extend between the uprights 12 and project beyond one side of the frame 11 for supporting additional parts of the mechanism that will be described hereinafter.

At the right hand end of the chute 26 a spout 45 is provided for directing the flow of the heated popped corn into a mixing hopper 46 which is carried by the extensions of the frame angles 43 as seen more clearly in FIGURE 1. Extending upwardly along the sides of the mixing hopper 46 and supported by the extensions of the frame angles 43 is a pair of straps 47 which carry at their upper ends an edible powdered binder hopper 48 which is provided with an opening 49 at the bottom through which the binder can flow into the mixing hopper 46 therebelow simultaneously with the flow of popped corn. The details of the composition of the binder powder and the method of making it will be set forth hereinafter.

It is desirable that the flow of the binder powder from the hopper 48 be uniform and continuous. For this purpose an agitator is employed which includes a shaft 50 that is rockably mounted at its ends in suitable bearings carried by the side walls of the hopper 48 and from which blades 51 project radially for stirring continuously the binder powder at the bottom of the hopper 48. Provision is made for rocking the shaft 50 through the agency of an arm 52 which is carried at one end and is connected by a link 53 to a clamp screw 54 that is adjustably secured to an arm 55 which projects downwardly from and moves with the chute 26. A slot 56 is provided in the arm 55 for receiving the clamp screw 54.

Now it will be apparent that, when the chute 26 is oscillated in the manner previously described, the arm 55 will be similarly moved and through the link 53, the arm 52 will be rocked as indicated at 57 in FIGURE 1 to rock the shaft 50 and effect corresponding movement of the blades 51.

It is desirable that the popped corn and the binder powder be thoroughly mixed in the mixing hopper 46 so that the former will be thoroughly coated by the latter. However, it is desirable that the binder powder be such that the kernels of popped corn, when coated thereby, will not stick to the interior walls of the mixing hopper 46 or to the parts employed for forming the kernels into shapes such as balls. This result is obtained through the use of the particular binder powder to be described hereinafter.

As shown in FIGURE 3 of the drawings, the popped corn and the binder powder flow simultaneously into the mixing hopper 46 and the flow thereof is directed by baffles 60 and 61. In addition, agitators 62, 63, 64 and 65 are provided for thoroughly intermixing the binder powder and the popped corn. These agitators are in the form of rods, shown more clearly in FIGURE 4, and provision is made for driving the outer agitators 62 and 65 in one direction and the inner agitators 63 and 64 in the opposite direction in order to effect a thorough coating of the popped corn kernels by the binding powder. Any suitable mechanical arrangement can be employed for effecting such a drive.

In accordance with this invention the agitators 62—65 are driven by the motor 40. For this purpose the rods forming the agitators 62 extend radially from a hollow shaft which is suitably rotatably mounted at one side of the mixing hopper 46 and is provided with a pulley 67 and a sprocket 68 fast thereon. Within the hollow shaft 66 is a shaft 69 which extends through the opposite side of the mixing hopper 46 and has fast thereon the agitators 63 and 64. At its outer end the shaft 69 carries a sprocket 70. The shaft 69 extends through a hollow shaft 71 which is journaled by suitable means on the side wall of the mixing hopper 46 opposite that where the hollow shaft 66 is journaled and it carries the rods comprising the agitator 65. At its outer end the hollow shaft 71 is provided with a sprocket 72.

Provision is made for driving the agitators 62—65 through the agency of a belt 73 which extends over the pulley 67 and also over a pulley 74 which is fast on a shaft 75 that is journaled in a bearing 76 carried by one of the uprights 12 as shown more clearly in FIGURE 1. Fast on the shaft 75 is a pulley 77 over which a belt 78 extends underneath an idler pulley 79. The belt 78 is driven by a pulley 80 which is mounted on the gear reducer 36 on the side opposite the pulley 35. Thus, when the motor 40 is operating the pulley 67 is rotated through the drive linkage just described.

A chain 81 is trained over the sprocket 68 and also over a sprocket 82, FIGURE 1, which is fast on one end of a jack shaft 83 that is journaled in bearings 84. At the other end of the jack shaft 83 is a sprocket 85 over which a chain 86 is trained and it also is trained over the sprocket 72. Thus, when the pulley 67 is rotated, the agitators 62 and 65 are rotated in the same direction.

As shown in FIGURE 2 the chain 86 is trained underneath a sprocket 87 which, together with a sprocket 88, is fast on a shaft 89 that is journaled in a bearing 90 which is mounted on one of the support straps 47. A chain 91 is trained over the sprocket 88 and also the sprocket 70 so that the agitators 63 and 64 are rotated in a direction opposite to the direction in which the agitators 62 and 65 are rotated.

As shown in FIGURE 4, the mixing hopper 46 is provided with a discharge opening 94 at the bottom so that the popped corn thoroughly coated with the binder powder can be discharged downwardly therefrom under the influence of gravity. It is desirable that the interior of the mixing hopper 46 be maintained at an elevated temperature whereby the binder is rendered sufficiently tacky to cause the kernels of popped corn to adhere when subjected to pressure but insufficient to cause them to adhere to the walls of the hopper 46 to any substantial extent. It will be recalled that the popped corn is delivered to the mixing hopper 46 from the chute 26 at an elevated temperature because of the provision of the space heaters 27. The popped corn is maintained at the elevated temperature by means of space heaters 95 that are applied to the outer walls of the mixing hopper 46 on the four sides near the bottom. The space heaters 95, like the space heaters 27, are connected to a suitable source of electric current (not shown) and the current flow therethrough is adjusted to provide the desired operating conditions. It will be understood, of course, that other heating means can be employed, if desired.

Below the discharge opening 94 there is positioned a popped corn ball forming mechanism which is shown, generally, at 96. While a mechanism for forming the coated popped corn into balls is described, it will be understood that other mechanisms can be employed and that other shapes can be formed. For example, the coated popped corn can be formed into cylindrical shapes or rectangular shapes or it can be formed into objects simulating animals, people, birds, trees, etc. The term "popped corn balls" as used herein and in the appended claims is intended to refer not only to ball shapes but also to these other shapes.

The popped corn ball forming mechanism 96 is illustrated in more detail in FIGURES 5-9 of the drawings to which reference now will be had. This mechanism includes a receiver 97 which is carried by the extensions of the frame angles 43 and is positioned directly underneath the discharge opening 94 of the mixing hopper 46. On opposite sides of the receiver 97 are guide rods 98 which are stationarily mounted and extend horizontally. Slidably mounted on the stationary guide rods 98 are cross heads 99 and 100 carrying forming dies 101 and 102 which extend toward each other. As shown in FIGURE 4, the forming die 102 is arranged to be positioned at one end of a cylindrical opening extending horizontally through the receiver 97 while the forming die 101 is arranged to extend into and through this cylindrical opening and it is moved to effect the forming operation to be described presently. The opposing ends of the forming dies 101 and 102 are provided with hemispherical cavities 103 and 104 when it is desired to form the coated popped corn into balls. However, other shapes of cavities can be employed where it is desired to form other shapes of objects. The intermediate portion 105 of the forming die 101, which is substantially longer than the forming die 102, functions as a valve to close off the discharge opening 94 of the mixing hopper 46 during the formation of a ball.

The forming die 102 is moved through the agency of the forming die 101. To the cross head 99 of the latter are connected connecting rods 106. The opposite ends of these rods 106 are connected to eccentric arms 107 that are arranged to be rotated through a gear reducer 108 that is driven by a pulley 109, FIGURE 2. A belt 110 interconnects the pulley 109 and a pulley 111 driven by an electric motor 112. The motor 112 is carried by a support plate 113 which depends from a support angle 114 which is located at one end of the guide rods 98 and is further supported by a brace 115.

Figure 5:
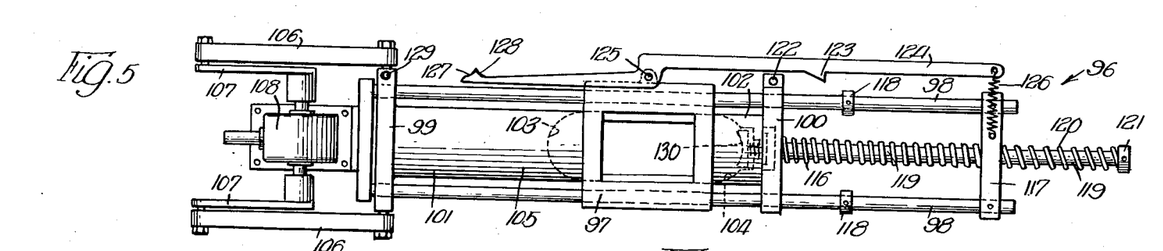
FIGURE 5 is a top plan view of the popped corn ball forming mechanism, the dies being shown in the full open position.

As the forming die 101 moves to the right, as viewed in FIGURE 5, it causes the forming die 102 to move in the same direction against the biasing action of a coil compression spring 116 which is positioned between a cross member 117 at the right hand end of the guide rods 98 and the cross head 100. The movement of the cross head 100 to the right is limited by adjustable stops 118 in the form of collars that can be positioned as desired along the guide rods 98. The coil compression spring 116 is positioned around a rod 119 which is secured at one end to the cross head 100 and extends through the cross member 117 and beyond it for receiving a buffer spring 120. A collar 121 is secured to the outer end of the rod 119 for containing the buffer spring 120. It will be understood that the spring 120 is employed to reduce the shock incident to the return of the forming die 102 to the position shown in FIGURE 4 where it closes off one end of the horizontal opening through the receiver 97.

With a view to holding the forming die 102 in the open position to permit the formed object to be ejected therefrom, a pin 122 is positioned at one end of the cross head 100 and projects upwardly therefrom. The pin 122 is arranged to be engaged by a tooth 123 to hold the cross head 100 and the forming die 102 in the extended position. The tooth 123 is carried by a control lever 124 which is pivoted intermediate its ends at 125 on the receiver 97. A coil tension spring 126 which is strained between the right hand end of the lever 124 and an anchor on the cross member 117 serves to bias the tooth 123 into the path of movement of the pin 122. At the other end of the control lever 124 cam faces 127 and 128 are provided which are arranged to be engaged by a trip release pin 129 that extends upwardly from the cross head 99 and is movable therewith. Thus, as the cross head 99 is moved to the right, the trip release pin 129 engages the cam face 127 and shifts the control lever 124. On its return stroke, it engages the cam face 128 and effects a similar movement, this time moving the tooth 123 out of restraining engagement with the pin 122 and permitting the spring 116 to return the forming die 102 to the initial position.

It is desirable that means be provided for ejecting automatically the formed ball from the forming die 102. For this purpose, as shown in FIGURE 4, a ball ejector plate 130 is provided the surface of which conforms to the spherical surface of the cavity 104. The plate 130 is carried by a stem 131 which is slidably mounted in the forming die 102. A coil compression spring 132, surrounding the stem 131, functions to bias the plate 130 outwardly so that, when the pressure is relieved on the ball after the forming operation has been completed, the movement of the plate 130 outwardly is permitted and the ball is ejected.

It has been pointed out hereinbefore that provision is made for coating the heated popped corn with a dry edible binder in a powdered form. This makes it possible to form the popped corn balls or other objects as a continuous process rather than to employ a batch process which is employed when the popped corn is mixed with a binder in liquid or syrup form.

In accordance with this invention the binder powder is formed first as a syrup. Then it is cooked, cooled and allowed to harden. The solid form is then pulverized to provide the binder powder.

Typical ingredients for the syrup are as set forth below in the proportions indicated:

1# corn syrup
½# granulated sugar
1 ounce butter or margarine
1 T. vinegar

These ingredients are mixed and heated to a temperature in the range of 290° to 300° F. and are cooked at this temperature to thoroughly blend them. Then the cooked material is allowed to cool and solidify into slabs or blocks. Next the solid material is pulverized to a fine size such as the size or flour, preferably in a refrigerated dry room. Unless the powder is to be used immediately, it is sealed in suitable containers to prevent contact with the air.

A substantial amount of the dry edible binder is placed in the binder hopper 48 to carry out the coating process.

In describing the operation of the popped corn ball making machine 10, it will be assumed that both of the motors 40 and 112 are operating and that the space heaters 27 and 95 are energized. Further, it will be assumed that the popped corn hopper 29 is filled with popped corn and that the hopper 48 is filled with the dry edible binder powder manufactured in the manner above described of the ingredients above set forth.

Under these operating conditions the chute 26 and hopper 29 are oscillated so that the popped corn moves downwardly therethrough from the hopper 29 through the heated space in the chute 26 to the mixing hopper 46. At the same time the binder powder drops through the opening 49 simultaneously with the flow of popped corn into the mixing hopper 46. The agitators 62—65 are rotating in the directions indicated to thoroughly mix the popped corn with the binder powder to the end that the former will be thoroughly coated by the latter. This is accomplished in the heated space within the mixing hopper 46.

Figure 6:
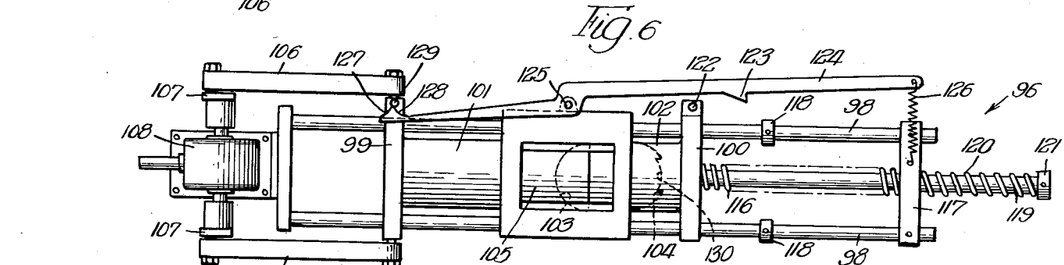
FIGURE 6 is a view, similar to FIGURE 5, but showing one of the dies moving to cut off the discharge from the mixing hopper and to compress the coated popped corn kernels between it and the other die.

The coated popped corn falls through the opening 94 at the bottom of the mixing hopper 46 into the space between the cavities 103 and 104 in the dies 101 and 102 positioned as shown in FIGURE 4 and also in FIGURE 5. As the forming die 101 moves to the right, as shown in FIGURE 6, the intermediate portion 105 closes off the opening 94 and the coated popped corn between the dies 101 and 102 is compressed since the die 102 is held against movement to the right by the coil compression spring 116. As the trip release pin 129 engages the cam face 127, the control lever 124 is rocked to the position shown in FIGURE 6. However, no other function is performed by the trip release pin 129 at this time.

Figure 7:
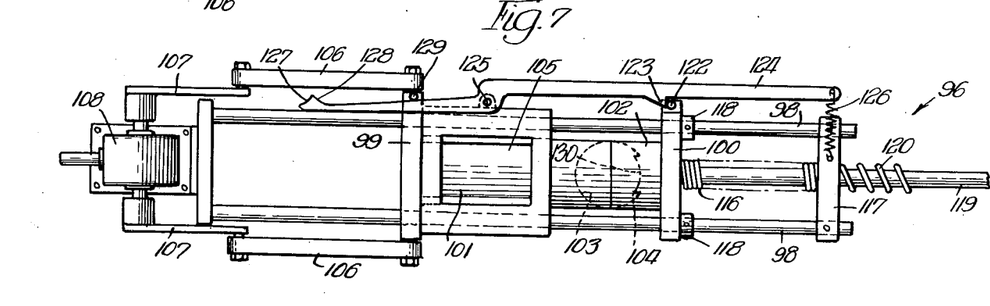
FIGURE 7 is a view, similar to FIGURE 6, but showing the dies in their fully extended position with the popped corn ball fully formed and held therebetween.
Figure 8:
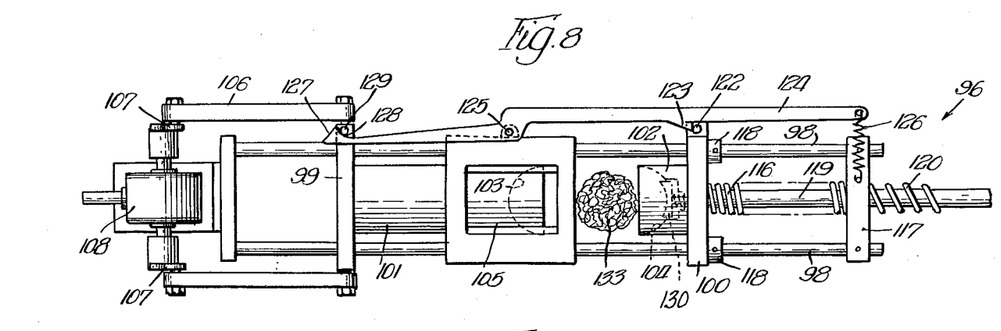
FIGURE 8 is a view, similar to FIGURE 7, showing one of the dies being held while the other die is moved away therefrom to permit the fully formed popped corn ball to be discharged downwardly.
Figure 9:
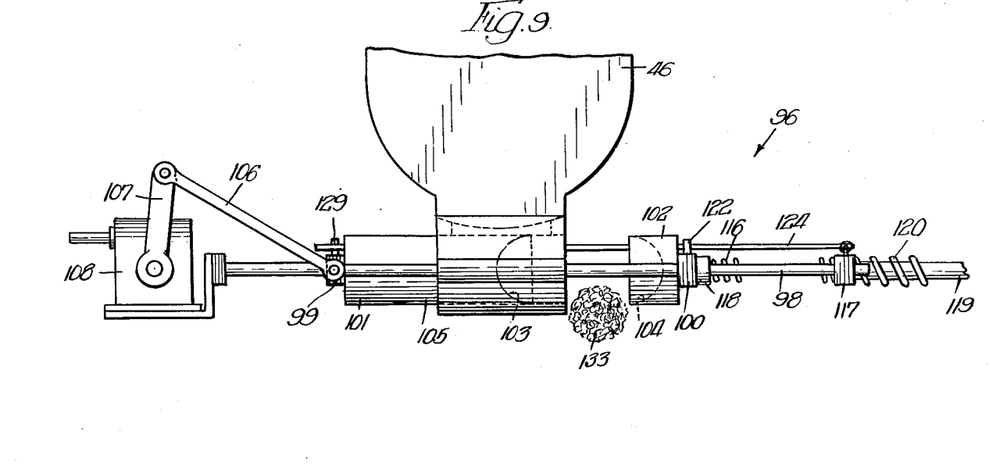
FIGURE 9 is a view, in side elevation, of the popped corn ball forming mechanism as shown in FIGURE 8.

The continued movement of the forming die 101 to the right, as shown in FIGURE 7, causes the intermediate portion 105 to close off completely the discharge opening 94 at the bottom of the mixing hopper 46. At the same time the right hand end picks up the left hand end of the forming die 102 and moves it to the right against the action of the spring 116. In the meantime, the trip release pin 129 has moved past the cam face 127 and the control lever 124 has been returned by the spring 126 to its normal position. As the pin 122 on the cross head 100 moves past the inclined portion of the tooth 123, it swings the control lever 124 outwardly until it reaches the end of the inclined portion whereupon the spring 126 swings the control lever 124 to the position shown in FIGURE 7 where the tooth 123 engages the pin 122 and holds the cross head 100 and the forming die 101 against the action of the spring 116. During the final movement of the dies 101 and 102 to the right, the coated popped corn between them is compressed into a ball, as indicated in FIGURES 8 and 9 of the drawings at 133. The stops 118 limit the movement of the cross head 100 and forming die 102 to the right and thus permit the necessary pressure to be applied to form the ball 133.

FIGURE 7 shows the extreme position of the forming die 101 in its forward movement. Continued rotation of the eccentric arms 107 then causes the cross head 99 and forming die 101 to move to the left. The result, as shown in FIGURE 8, is that the dies 101 and 102 are separated, the latter being held in the extended position through the interaction of the pin 122 and the tooth 123. Intermediate the return stroke of the forming die 101, the pin 129 engages the cam face 128 and as the pin 129 continues to move to the left, the operating lever 124 is swung to the position shown in FIGURE 6 where the tooth 123 is moved out of engagement with the pin 122. This releases the spring 116 and permits it to bias the cross head 100 and forming die 102 back to the initial position shown in FIGURE 4. Just prior to this return movement of the forming die 102 the formed popped corn ball 133 is ejected by the ball ejector plate 130 and it moves downwardly from between the dies 101 and 102, as shown in FIGURE 9, to a suitable receptacle.

As the cross head 100 and forming die 102 approach the initial position, the buffer spring 120 comes into play and cushions the arresting of the forming die 102.

Figures 10, 15:
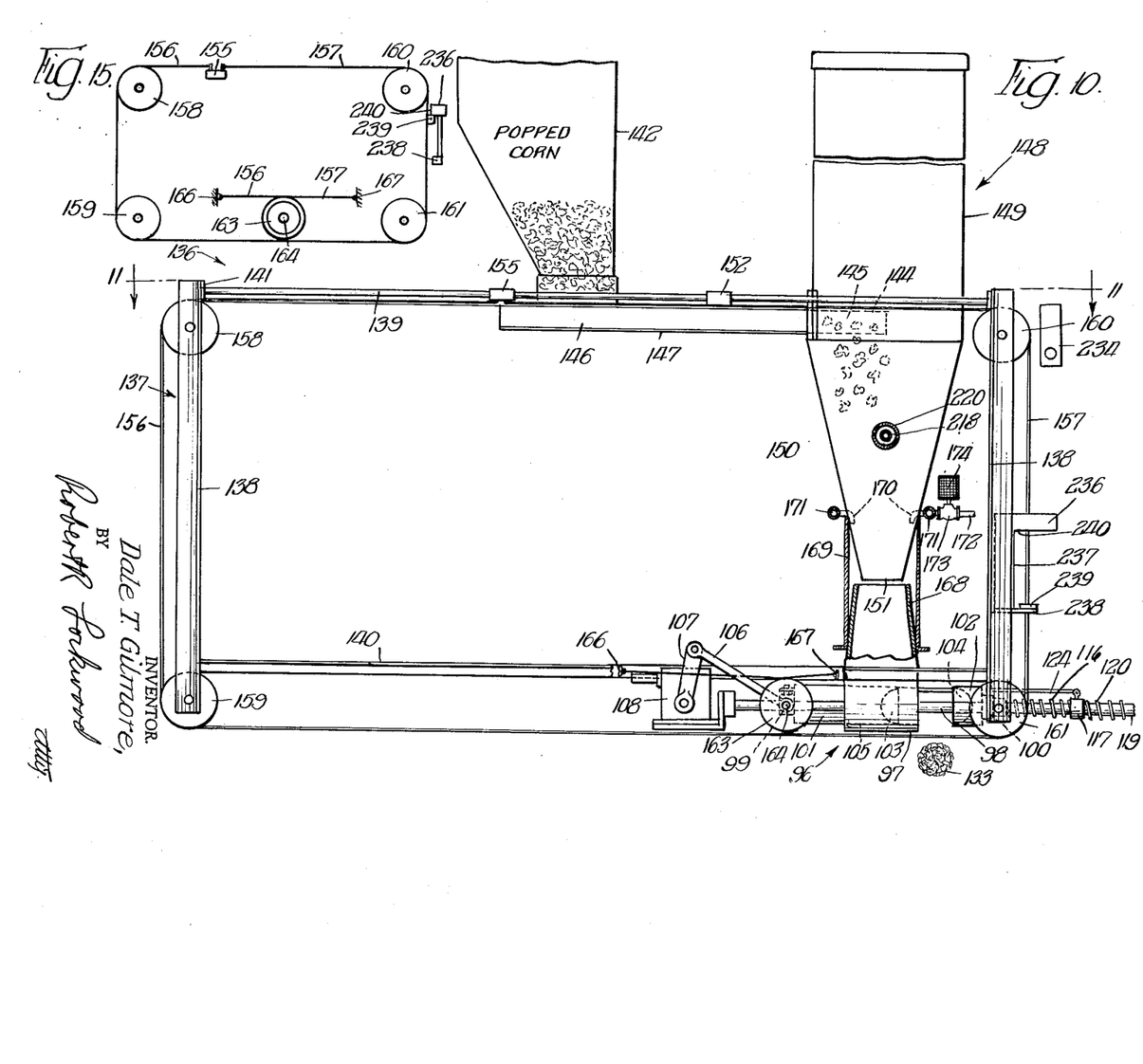
FIGURE 10 is a view, partly in side elevation and partly in section, showing another embodiment of the popped corn ball manufacturing machine in which the popped corn and binder are introduced into the mixing hopper separately and batchwise.
FIGURE 15 illustrates diagrammatically the mechanical interconnections between the motor driven forming mechanism and the slide which moves a batch of popped corn into the mixing hopper.
Figures 11, 16, 17:
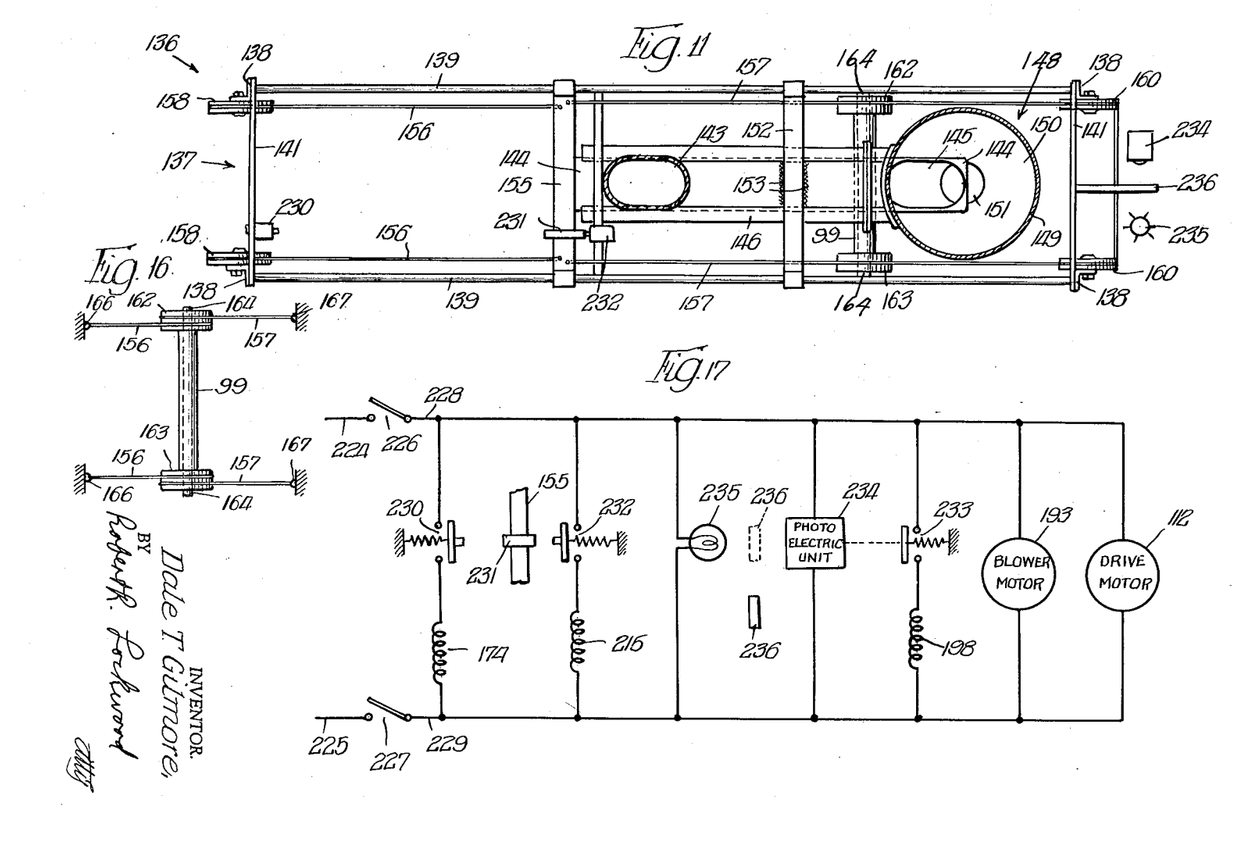
FIGURE 11 is a horizontal sectional view taken generally along the line 11—11 of FIGURE 10.
FIGURE 16 is a top plan view of the cross head which forms a part of the popped corn ball forming mechanism and showing how the cables are trained over pulleys at the ends thereof with the ends of the pulleys being anchored.
FIGURE 17 illustrates diagrammatically the circuit connections that can be employed for the operation of the popped corn ball making machine illustrated in FIGURES 10 to 16.

Referring now particularly to FIGURES 10 and 11 of the drawings, it will be observed that the reference character 136 designates, generally, a popped corn ball making machine which, insofar as the mixing of the popped corn and dry adhesive is concerned, operates on a batchwise principle. The popped corn ball forming mechanism 96, previously described, is employed for receiving the mixture and forming it into the desired shape. Insofar as the same parts are employed in the popped corn ball forming mechanism 96 as are shown in connection with FIGURES 1 to 9 of the drawings, the same parts and reference characters are shown and employed in connection with the popped corn ball making machine 136.

It will be observed that the popped corn ball making machine 136 has a generally rectangular support frame, shown generally at 137. The support frame 137 is formed in part by upright frame members 138 in the form of rolled angle sections which are interconnected by longitudinal top and bottom frame members 139 and 140. Transverse end members 141 extend across the end of the support frame 137 at the top and bottom. It will be understood that the construction of the support frame 137 is such as to provide a rigid support for the parts mounted thereon.

Intermediate the ends of the longitudinal top frame members 139 and supported by both of them is a popped corn hopper 142 which, as indicated, is supplied with popped corn. At the lower end of the popped corn hopper 142 there is an elongated discharge opening 143, FIGURE 11, the ends of which are rounded. The discharge opening 143 is positioned over a slide 144 which has an opening 145 at one end that is arranged to register with the discharge opening 143 at the bottom of the popped corn hopper 142 for receiving a batch of popped corn. The slide 144 is mounted for translatory movement in a tubular frame 146 which has a rectangular cross section and a flat bottom 147.

It will be understood that the charge or batch of poped corn received in the opening 145 in the slide 144 and on the flat bottom 147 of the frame 146 is discharged into a mixing hopper that is indicated, generally, at 148. The mixing hopper 148 has a cylindrical upper end 149 and a truncated conical lower end 150. At its lower end the conical end 150 has a discharge opening 151 which is substantially smaller in diameter than the diameter of the cylindrical upper end 149. It will be observed in FIGURE 10 that the batch of popped corn is discharged by the slide 144 into the lower end of the conical upper end 149 and just above the upper end of the truncated conical lower end 150 of the mixing hopper 148.

The tubular frame 146 is suitably supported between the longitudinal top frame members 139. Included in the support is transverse bar 152 which is secured at its ends to the longitudinal top frame members 139 and intermediate its ends is welded, as indicated at 153, to the top of the tubular frame 146.

Secured to the left end of the slide 144 is a cross head 155 the ends of which slide along the upper surfaces of the left ends of the longitudinal top frame members 139. Cables 156 and 157 are secured at one end to the cross head 155 as shown in FIGURE 11. The cables 156 and 157 extend in opposite directions from the cross head 155 and are trained over pulleys 158 and 159 at the left end of the support frame 137 and over pulleys 160 and 161 at the right end of the support frame 137 as shown more clearly in FIGURE 10 of the drawings. The cables 156 and 157 also are trained over pulleys 162 and 163 which are rotatably mounted on trunnions 164 which project laterally from the cross head 99 which forms a part of popped corn ball forming mechanism 96 and is reciprocated in the manner previously described by the motor 112 operating through the gear reducer 108, eccentric arms 107 and connecting rods 106. The other ends of the cables 156 and 157 are anchored at 166 and 167 to the bottom frame members 140 of the support frame 137. The arrangement of the cables 156 and 157 with respect to the pulleys 162 and 163 and the anchorages at 166 and 167 is shown more clearly in FIGURE 16 of the drawings.

FIGURE 15 shows diagrammatically the arrangement of the cables 156 and 157 with reference to the attachment at 166 and 167 to the frame 137 and the relationship with the pulleys 162 and 163, only one being shown here. It will be understood that for a given movement of the trunnions 164 and of the pulleys 162 and 163 the cross head 155 will move through double such extent of movement. Thus the cross head 155 and slide 144 attached thereto move twice as far as the cross head 99 and parts connected directly thereto move.

Figure 12:
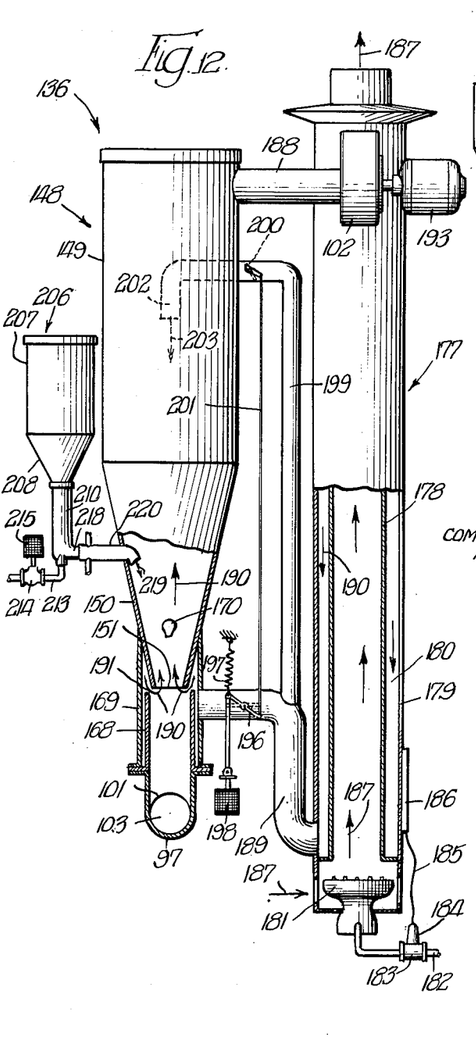
FIGURE 12 is a view, partly in end elevation and partly in section, of the machine shown in FIGURE 1 the illustration showing the mixing hopper and air heating and circulating means with the popped corn ball forming means and associated parts being omitted.

Referring now particularly to FIGURES 10 and 12 of the drawings, it will be observed that the discharge opening 151 is located slightly above the upper end of a conduit 168 into which the mixture of popped corn and binder is discharged into the receiver 97 which is associated with the popped corn ball forming mechanism 96. Surrounding the conduit 168 and spaced therefrom is a sleeve 169 the purpose of which will be described presently.

It is desirable that provision be made for preventing the adherence to the inner walls of the truncated conical lower end 150 of the mixing hopper 148 by the kernels of popped corn which have been coated with the binder. In order to avoid such adherence several air jets 170 are provided and are arranged to direct streams of compressed air over the inner surfaces of the truncated conical lower end 150 and around the periphery of the discharge opening 151. Air is supplied to the air jets 170 from a manifold 171 which surrounds the lower portion of the truncated conical lower end 150. The manifold 171 is connected to a conduit 172 through a valve 173. The valve 173 normally is closed and can be opened on energization of a solenoid 174 in a manner to be described presently. It will be understood that the conduit 172 is connected to a suitable source of compressed air.

The mixture of the popped corn and edible pulverulent adhesive binder is effected by causing a stream of heated air to flow upwardly through the mixing hopper 148. The heated air is provided by an air heater the details of construction of which are shown more clearly in FIGURE 12. Here it will be observed that the air heater 177 is provided with a central flue 178 which is concentrically located within a cylindrical shell 179 so that an air space 180 is provided therebetween. At the bottom of the flue 178 there is a suitable heating source such as a gas burner 181 which is supplied with gas through a gas conduit 182. A gas valve 183 controls the flow of fuel to the burner 181. It is controlled automatically by a control 184 which is connected at 185 to a temperature responsive member 186 located near the lower end of the shell 179. It will be understood that any suitable heat source can be employed other than gas, such as oil or electrical energy, and that any suitable automatic means can be provided for controlling the amount of heat as may be desired. Atmospheric air flows, as indicated by the arrows 187, through the flue 178 and out at the upper end and heat supplied thereto is transferred to air which occupies the air space 180 around the flue 178 and within the shell 179. At its upper end the space 180 is connected by a conduit 188 to the upper end of the mixing hopper 148. A conduit 189 interconnects the lower end of the air space 180 with the space within the sleeve 169. Air flows, as indicated by the arrows 190, from the space within the sleeve 169 through the annular space 191 between the upper end of the conduit 168 and the periphery of the discharge opening 151 upwardly through the truncated conical lower end 150 and into the cylindrical upper end 149 of the mixing hopper 148. The stream of heated air, indicated by the arrows, 190, flows upwardly through the mixing hopper 148 with substantial velocity which is provided by a blower 192 that is driven continuously by a blower motor 193.

After a batch of popped corn has been thoroughly mixed with a batch of pulverulent binder, it is desirable that the upward flow of heated air, indicated by the arrows 190, be terminated so as to permit the mixed batch to fall through the discharge opening 151 into the conduit 168 and thence into the receiver 97. For this purpose a butterfly valve 196 is provided in the conduit 189, as shown in FIGURE 12, and it is normally held open by a spring 197. The butterfly valve 196 is closed by a butterfly valve solenoid 198 the operation of which will be described presently.

Since the blower 192 operates continuously, it is desirable that, when the butterfly valve 196 is closed on energization of the butterfly valve solenoid 198, the flow of heated air continue into the mixing hopper 148 in a direction which will assist in the discharge of the mixed batch of popped corn and binder. For this purpose a by pass conduit 199 is connected to the conduit 189 at the lower end and at its upper end the conduit 199 extends into the cylindrical upper end 149 of the mixing hopper 148. A butterfly valve 200 is provided in the by pass conduit 199 and it is connected by a rod 201 to operate conjointly with the butterfly valve 196. It will be observed that the butterfly valve 200 is closed when the butterfly valve 196 is open. The inner end 202 of the by pass conduit 199 is turned downwardly so that, when the butterfly valve 196 is closed and butterfly valve 200 is opened, the flow of heated air takes place downwardly in the direction indicated by the arrow 203.

Figure 13:
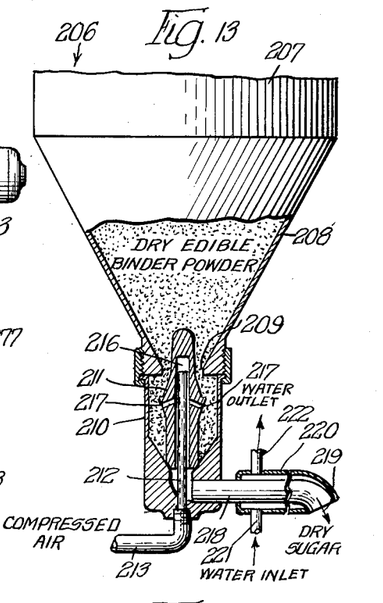
FIGURE 13 is a view, at an enlarged scale, partly in side elevation and partly in section of the lower portion of the edible powdered binder hopper showing the valve at the bottom in the closed position.
Figure 14:
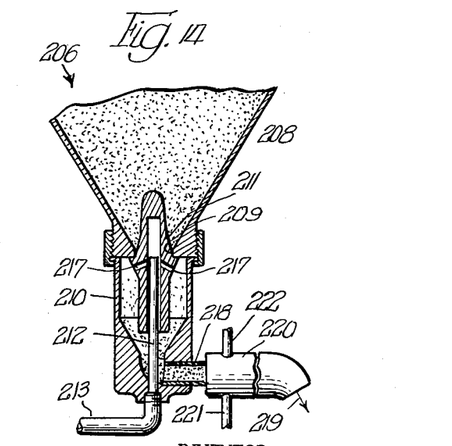
FIGURE 14 is a view, similar to FIGURE 13, but showing the valve in the open position for the discharge of a batch of the binder into the mixing hopper.

In order to cause the kernels of popped corn to adhere, the powdered binder, previously described, is employed. The powdered binder is fed from an edible powdered binder hopper 206 into the mixing hopper 148 at a position below the place where the batch of popped corn is introduced. As shown in FIGURES 12, 13 and 14 of the drawings the edible powdered binder hopper 206 includes a cylindrical upper end 207 and a truncated conical lower end 208 which is provided at its lower end with a valve seat 209 and opens into a charge or batch chamber 210. A valve 211 is slidable in the chamber 210 for engaging the valve seat 209 and preventing further flow of the dry edible binder powder into the chamber 210. The valve 211 is slidable on an air pipe 212 which is connected by a conduit 213 through a valve 214 to a suitable source of air under pressure. For example, the same source of compressed air can be used that is employed for supplying compressed air to the conduit 172 previously described. A powder valve solenoid 215 controls the operation of the valve 214 which normally is closed. On energization of the solenoid 215 the valve 214 is opened to permit the flow of compressed air through the conduit 213. The flow of compressed air through the conduit 213 raises the valve 211 to the position shown in FIGURE 14 where further flow of the dry edible binder powder into the charge or batch chamber 210 is prevented. The compressed air then flows from the interior of the valve 211 through downwardly angled radially extending ports 217 in the valve 211 to force the dry edible binder powder in the charge or batch chamber 210 out of a conduit 218 to discharge, as indicated at 219, into the stream of heated air, indicated by the arrows 190, below the charge of popped corn introduced thereabove by the slide 144 in the manner previously described.

It is desirable that the heat from the upwardly flowing stream of air not be applied to the dry edible binder powder prior to the time that it is discharged into the mixing hopper 148. In order to accomplish this a water jacket 220 extends around the conduit 218 for some distance from the discharge end. Cold water is supplied to the water jacket 220 through an inlet 221 and it is exhausted through an outlet 222.

FIGURE 17 shows the electric circuit connections that can be employed for operating the popped corn ball making machine 136. Here it will be observed that conductors 224 and 225 are provided which can be connected to a suitable source of current, such as a 60 cycle 115 volt source. Switches 226 and 227 are employed for interconnecting the conductors 224 and 225 with conductors 228 and 229 which extend to the various electrical devices that are to be energized or switches that are to be closed. One of these switches is a limit switch 230 and is arranged, when its contacts are closed, to complete an energizing circuit for the solenoid 174 for the air jet valve 173. It will be noted that this circuit is completed between the conductors 228 and 229. The limit switch 230 is operated to the closed position by an operator 231 which is carried by the cross head 155 that is attached to and moves with the slide 144 in the manner previously described. The physical position of the limit switch 230 is shown in FIGURE 11 as is the position of a limit switch 232 which, as shown in FIGURE 17, is operated by the operator 231 for effecting the energization of the solenoid 215 which opens the valve 214.

The operation of the butterfly valve solenoid 198 is under the control of a control switch 233 which is operated by a photoelectric unit 234. Light for operating the photoelectric unit 234 is supplied by a light source 235 in the form of a tungsten filament lamp or its equivalent. The light from the source 235 is interrupted by a shield 236 which is mounted on a carrier 237 which is guided for vertical movement between the upright frame members 138 at the right end of the support frame 137 as shown in FIGURE 10. The carrier 237 has a lower arm 238 which is arranged to be engaged by the under side of lug 239 that is secured to and moves with the flexible cable 157. The upper side of the lug 239 is arranged to engage the under side of an upper arm 240 to move the carrier 237 upwardly on a corresponding movement of the cable 157.

In describing the operation of the popped corn ball making machine 136 it will be assumed that, as shown in FIGURE 10, a batch of popped corn has just been delivered to the mixing hopper 148 and that a batch of dry edible binder powder has been delivered therebelow. Under these assumed conditions the forming dies 101 and 102 are open, the cross head 99 is to the left and the cross head 155 and the slide 144 are to the right. A stream of heated air flows upwardly through the mixing hopper 148 since the butterfly valve 196 is closed, the solenoid 198 being deenergized since light from the source 235 impinges on the photoelectric unit 234 because the shield 136 is in the lowermost position shown in FIGURE 10. The solenoid 215 is energized since the contacts of limit switch 232 are closed because the operator 231 is in the position described. The solenoid 174 for the valve 173 is deenergized since the contacts of limit switch 230 are open. The drive motor 112 and the blower motor 193 are operating continuously, such operation being initiated on closure of the switches 226 and 227.

The cross head 155 and slide 144 move to the left while the popped corn ball forming mechanism 96 operates in a manner previously described to close on a previous charge or batch of coated popped corn and shut off the bottom of the conduit 168. As soon as the cross head 155 moves to the left, the contacts of limit switch 232 are opened and the solenoid 215 for the valve 214 is deenergized. The valve 211 then returns to the position shown in FIGURE 13 where the dry edible binder powder flows downwardly to fill the charge or batch chamber 210. As the result of the continued upward flow of heated air, indicated by the arrows 190, the popped corn and dry edible binder powder are thoroughly intermixed within the mixing hopper 148.

When the cross head 155 and slide 144 reach the limit of the travel to the left, the opening 145 in the slide 144 registers with the discharge opening 143 at the bottom of the popped corn hopper 142. A batch of popped corn then fills the opening 145.

At this time the shield 236 is moved so as to intercept the light rays from the source 235, as indicated by the broken line position shown in FIGURE 17, so that the photoelectric unit 234 is operated in turn to effect the closure of the contacts of the control switch 233 and cause the energization of the butterfly valve solenoid 198. Accordingly, butterfly valve 196 is closed, shutting off the upward flow of heated air, as indicated by the arrows 190, and butterfly valve 200 is opened to reverse the flow of heated air as indicated by the arrow 203. The batch of mixed popped corn and binder no longer is sustained in the mixing hopper 148 and it falls through the discharge opening 151.

At about this time the operator 231 effects the closure of the contacts of the limit switch 230 to energize solenoid 174 and cause compressed air to flow out of the air jets 170 and downwardly over the inner surfaces of the truncated conical lower end 150 of the mixing hopper 148 and around the discharge opening 151. This prevents the adherence to the surfaces of any of the kernels of popped corn which now are coated with the binder.

At this part of the cycle the dies 101 and 102 of the popped corn ball forming mechanism 196 are closed.

Next the cross head 155 and slide 144 are moved to the right to bring another batch of popped corn to the mixing hopper 148. As soon as the cross head 155 moves from its extreme left position, the contacts of limit switch 230 are opened and solenoid 174 is deenergized.

The dies 101 and 102 are opened to receive the batch of coated popped corn, the amount being just sufficient to fill the cavities 103 and 104 when the same are brought together so as to form the completed ball 133. That is, the arrangement is such that the amount of the batch of popped corn delivered by each movement of the slide 144 together with the batch of dry edible binder powder delivered in the manner described, is sufficient to form the complete ball 133.

Because of the time delay provided in the movement of the lug 239 from engagement with the under side of the upper arm 240 to engage the upper side of the lower arm 238, the shield 236 is not moved out of registry with the light source 235 until the slide 144 is midway through its movement to the right or discharging position. Then the lug 239 engages the lower arm 238 and causes movement of the shield 236 out of registry with the light source 235. As a result the contacts of the control switch 233 under the control of the photoelectric unit 234 are opened and the butterfly valve solenoid 198 is deenergized. The spring 197 then opens butterfly valve 196 and closes the butterfly valve 200. The cycle of operation then continues.

It will be understood that cold water is supplied to the water jacket 220 for cooling the conduit 218 through which the dry edible binder powder is discharged into the mixing hopper 148. The cold water is supplied continuously as long as the popped corn ball making machine 136 remains in operation.

This application is a continuation-in-part of application Serial No. 603,615, filed August 13, 1956, now Patent No. 2,958,602 issued November 1, 1960.

Since certain further changes can be made in the foregoing constructions and methods and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A machine for making objects of popped corn comprising, in combination, a popped corn hopper and an edible powdered binder hopper, means mounting the same to discharge into a mixing hopper defining a mixing space and having a discharge opening at the bottom, said mounting means including an inclined chute between said popper corn hopper and said mixing hopper and means for supplying heat to said chute for heating the popped corn as the same flows therethrough, and forming means below said opening for receiving the popped corn coated with the binder and compressing the same into the desired shape.

2. A machine for making objects of popped corn comprising, in combination, a popped corn hopper and an edible powdered binder hopper, means mounting the same to discharge into a mixing hopper defining a mixing space and having a discharge opening at the bottom, said mounting means including an inclined chute between said popped corn hopper and said mixing hopper and means for heating the space within said chute for heating the popped corn as the same flows therethrough, means for oscillating said chute to facilitate the flow of the popped corn therethrough, means for heating the space within said mixing hopper to a temperature whereat the binder is rendered sufficiently tacky to cause the kernels of popped corn to adhere when subjected to pressure but insufficient to cause them to adhere to the walls of said hopper to any substantial extent.

3. The invention as set forth in claim 2 wherein the popped corn hopper is mounted on the chute and is oscillated therewith.

4. A machine for making objects of popped corn comprising, in combination, a popped corn hopper and an edible powdered binder hopper, means mounting the same to discharge into a mixing hopper defining a mixing space and having a discharge opening, means for heating the space within said mixing hopper to a temperature whereat the binder is rendered sufficiently tacky to cause the kernels of popped corn to adhere when subjected to pressure but insufficient to cause them to adhere to the walls of said hopper to any substantial extent, a pair of dies relatively movable horizontally of said mixing hopper for receiving therebetween from said opening therein a quantity of the coated popped corn, and means for moving said dies relative to each other to form the coated popped corn in the desired shape and to discharge the same.

5. A machine for making objects of popped corn comprising, in combination, a popped corn hopper and an edible powdered binder hopper, means mounting the same to discharge the popped corn and edible binder into a mixing hopper defining a mixing space and having a discharge opening at the bottom, means for mixing the contents of said mixing hopper, means for heating the space within said mixing hopper to a temperature whereat the binder is rendered sufficiently tacky to cause the kernels of popped corn to adhere when subjected to pressure but insufficient to cause them to adhere to the walls of said hopper to any substantial extent, a receiver below said opening for the popped corn coated with a binder, a pair of dies movable horizontally of said receiver for receiving therebetween a quantity of the coated popped corn, means slidably mounting said dies, stop means limiting the movement of one die away from said receiver and means biasing it toward the same, power means connected to the other die for moving it through said receiver to close said discharge opening and compress the contents of said receiver by moving the same toward said one die and both dies against said biasing means until said one die is arrested by said stop means while continued movement of said other die effects final compression between said dies, latch means for holding said one die in its displaced position against the action of said biasing means while said other die is being retracted by said power means to permit discharge by gravity of the formed object, and means for releasing said latch means when said other die has been retracted a predetermined extent.

6. A machine for making objects of popped corn comprising, in combination, a mixing hopper, means for feeding popped corn to said hopper, means independent of said popped corn feeding means for feeding a dry edible binder to said hopper, means causing a flow of heated air through said hopper at a rate sufficient to tumble the popped corn and binder and at a temperature whereat the binder is rendered sufficiently tacky to cause the kernels of popped corn to adhere when subjected to pressure but insufficient to cause them to adhere to the walls of said hopper to any substantial extent, and forming means for receiving the mixed contents of said hopper and compressing the same into the desired shape.

7. A machine for making objects of popped corn comprising, in combination, a mixing hopper having a discharge opening, means for feeding popped corn and a dry edible binder to said hopper, means causing a flow of heated air through said hopper at a rate sufficient to tumble the popped corn and binder and at a temperature whereat the binder is rendered sufficiently tacky to cause the kernels of popped corn to adhere when subjected to pressure but insufficient to cause them to adhere to the walls of said hopper to any substantial extent, a pair of dies relatively movable horizontally of said mixing hopper for receiving therebetween from said opening therein a quantity of the coated popped corn, and means for moving said dies relative to each other to form the coated popped corn in the desired shape and to discharge the same.

8. A machine for making objects of popped corn comprising, in combination, a mixing hopper, means for feeding popped corn and a dry edible binder to said hopper, means causing an upward flow of heated air through said hopper at a rate sufficient to tumble the popped corn and binder and at a temperature whereat the binder is rendered sufficiently tacky to cause the kernels of popped corn to adhere when subjected to pressure but insufficient to cause them to adhere to the walls of said hopper to any substantial extent, said mixing hopper having a discharge opening at the bottom, means for shutting off the upward flow of heated air thereby allowing the mixed contents of said hopper to fall through said discharge opening, and forming means for receiving said mixed contents of said hopper from said discharge opening and compressing the same into the desired shape.

9. A machine for making objects of popped corn comprising, in combination, a mixing hopper, means for feeding popped corn and a dry edible binder to said hopper, means causing an upward flow of heated air through said hopper at a rate sufficient to tumble the popped corn and binder and at a temperature whereat the binder is rendered sufficiently tacky to cause the kernels of popped corn to adhere when subjected to pressure but insufficient to cause them to adhere to the walls of said hopper to any substantial extent, said mixing hopper having a discharge opening at the bottom, means for reversing the flow of heated air to accelerate the fall of the mixed contents of said mixing hopper through said discharge opening, and forming means for receiving said mixed contents of said hopper from said discharge opening and compressing the same into the desired shape.

10. A machine for making objects of popped corn comprising, in combination, a mixing hopper, means for feeding popped corn and a dry edible binder to said hopper, means causing an upward flow of heated air through said hopper at a rate sufficient to tumble the popped corn and binder and at a temperature whereat the binder is rendered sufficiently tacky to cause the kernels of popped corn to adhere when subjected to pressure but insufficient to cause them to adhere to the walls of said hopper to any substantial extent, said mixing hopper having a discharge opening at the bottom, means for shutting off the upward flow of heated air thereby allowing the mixed contents of said hopper to fall through said discharge opening, means for directing air under pressure downwardly along the lower portion of said mixing hopper and around the periphery of said discharge opening to prevent adherence to the walls of said mixing hopper of said kernels of popped corn, and forming means for receiving said mixed contents of said hopper from said discharge opening and compressing the same into the desired shape.

11. A machine for making objects of popped corn comprising, in combination, a mixing hopper, means for feeding popped corn and a dry edible binder to said hopper, means causing an upward flow of heated air through said hopper at a rate sufficient to tumble the popped corn and binder and at a temperature whereat the binder is sufficiently tacky to cause the kernels of popped corn to adhere when subjected to pressure but insufficient to cause them to adhere to the walls of said hopper to any substantial extent, said mixing hopper having a discharge opening at the bottom, means for reversing the flow of heated air and at the same time directing air under pressure downwardly along the lower portion of said mixing hopper and around the periphery of said discharge opening to accelerate the fall of the mixed contents of said mixing hopper therethrough and to prevent adherence to the walls of said mixing hopper of said kernels of popped corn, and forming means for receiving said mixed contents of said hopper from said discharge opening and compressing the same into the desired shape.

12. A machine for making objects of popped corn comprising, in combination, a mixing hopper having a discharge opening at the bottom, a slide for moving a batch of popped corn into an upper portion of said mixing hopper, means for feeding a batch of dry edible pulverulent adhesive material into said mixing hopper below said batch of popped corn, means causing an upward flow of heated air through said hopper for mixing the popped corn and adhesive material, means for shutting off the upward flow of heated air thereby allowing the mixed batch of popped corn and adhesive material to fall through said discharge opening, and forming means for receiving said mixed batch from said discharge opening and compressing it into the desired shape.

13. A machine for making objects of popped corn comprising, in combination, a mixing hopper having a discharge opening at the bottom, a slide for moving a batch of popped corn into an upper portion of said mixing hopper, means operative concurrently with movement of said slide in moving said batch of popped corn into said mixing hopper for feeding a batch of dry edible pulverulent adhesive material into said mixing hopper below said batch of popped corn, means causing an upward flow of heated air through said hopper for mixing the popped corn and adhesive material, means for shutting off the upward flow of heated air thereby allowing the mixed batch of popped corn and adhesive material to fall through said discharge opening, and forming means for receiving said mixed batch from said discharge opening and compressing it into the desired shape.

14. A machine for making objects of popped corn comprising, in combination, a mixing hopper having a discharge opening at the bottom, a slide for moving a batch of popped corn into an upper portion of said mixing hopper, means for feeding a batch of dry edible pulverulent adhesive material into said mixing hopper below said batch of popped corn, means causing an upward flow of heated air through said hopper for mixing the popped corn and adhesive material, means for shutting off the upward flow of heated air thereby allowing the mixed batch of popped corn and adhesive material to fall through said discharge opening, forming means for receiving said mixed batch from said discharge opening and compressing it into the desired shape, and means operatively interconnecting said slide and said forming means whereby the same are operated in predetermined timed relation.

15. A machine for making objects of popped corn comprising, in combination, a mixing hopper having a discharge opening at the bottom, a slide for moving a batch of popped corn into an upper portion of said mixing hopper, means operative concurrently with movement of said slide in moving said batch of popped corn into said mixing hopper for feeding a batch of dry edible purverulent adhesive material into said mixing hopper below said batch of popped corn, means causing an upward flow of heated air through said hopper for mixing the popped corn and adhesive material, means for shutting off the upward flow of heated air thereby allowing the mixed batch of popped corn and adhesive material to fall through said discharge opening, forming means for receiving said mixed batch from said discharge opening and compressing it into the desired shape, and means operatively interconnecting said slide and said forming means whereby the same are operated in predetermined timed relation.

16. A machine for making objects of popped corn comprising, in combination, a mixing hopper having a discharge opening at the bottom, a slide for moving a batch of popped corn into an upper portion of said mixing hopper, means for feeding a batch of dry edible pulverulent adhesive material into said mixing hopper below said batch of popped corn, means causing an upward flow of heated air through said hopper for mixing the popped corn and adhesive material, means operative concurrently with movement of said slide to receive a batch of popped corn for movement into said mixing hopper for shutting off the upward flow of heated air thereby allowing the mixed batch of popped corn and adhesive material to fall through said discharge opening, and forming means for receiving said mixed batch from said discharge opening and compressing it into the desired shape.

17. A machine for making objects of popped corn comprising, in combination, a mixing hopper having a discharge opening at the bottom, a slide for moving a batch of popped corn into an upper portion of said mixing hopper, means operative concurrently with movement of said slide in moving said batch of popped corn into said mixing hopper for feeding a batch of dry edible pulverulent adhesive material into said mixing hopper below said batch of popped corn, means causing an upward flow of heated air through said hopper for mixing the popped corn and adhesive material, means operative concurrently with movement of said slide to receive a batch of popped corn for movement into said mixing hopper for shutting off the upward flow of heated air thereby allowing the mixed batch of popped corn and adhesive material to fall through said discharge opening, forming means for receiving said mixed batch from said discharge opening and compressing it into the desired shape, and means operatively interconnecting said slide and said forming means whereby the same are operated in predetermined timed relation.

18. A machine for making objects of popped corn comprising, in combination, a mixing hopper having a discharge opening at the bottom, a slide for moving a batch of popped corn into an upper portion of said mixing hopper, means for feeding a batch of dry edible pulverulent adhesive material into said mixing hopper below said batch of popped corn, means causing an upward flow of heated air through said hopper for mixing the popped corn and adhesive material, means for shutting off the upward flow of heated air thereby allowing the mixed batch of popped corn and adhesive material to fall through said discharge opening, means for directing air under pressure downwardly along the lower portion of said mixing hopper and around the periphery of said discharge opening to prevent adherence to the walls of said mixing hopper of said kernels of popped corn, and forming means for receiving said mixed batch from said discharge opening and compressing it into the desired shape.

19. A machine for making objects of popped corn comprising, in combination, a mixing hopper having a discharge opening at the bottom, a slide for moving a batch of popped corn into an upper portion of said mixing hopper, means operative concurrently with movement of said slide in moving said batch of popped corn into said mixing hopper for feeding a batch of dry edible pulverulent adhesive material into said mixing hopper below said batch of popped corn, means causing an upward flow of heated air through said hopper for mixing the popped corn and adhesive material, means operative concurrently with movement of said slide to receive a batch of popped corn for movement into said mixing hopper for shutting off the upward flow of heated air thereby allowing the mixed batch of popped corn and adhesive material to fall through said discharge opening, means operative concurrently with said movement of said slide to receive a batch of popped corn for movement into said mixing hopper for directing air under pressure downwardly along the lower portion of said mixing hopper and around the periphery of said discharge opening to prevent adherence to the walls of said mixing hopper of said kernels of popped corn, forming means for receiving said mixed batch from said discharge opening and compressing it into the desired shape, and means operatively interconnecting said slide and said forming means whereby the same are operated in predetermined timed relation.

20. Method of making objects of popped corn which comprises: feeding a batch of popped corn and a batch of dry edible pulverulent adhesive material into a stream of heated air flowing upwardly at a rate sufficient to tumble the same thereby coating the former with the latter, reversing the flow of heated air to accelerate the fall of the coated popped corn, and forming the coated popped corn into the desired shape.

21. Method of making objects of popped corn which comprises: passing a stream of air heated to a temperature whereat a syrup base edible binder is liquefied through a confined quantity of popped corn at a rate sufficient to tumble the same, simultaneously feeding a syrup base edible binder in finely divided dry power form and liquefiable at the temperature of the heated air into the stream in an amount sufficient to coat the tumbling popped corn, discontinuing the tumbling operation, and forming the coated popped corn into the desired shape.

22. Method of making objects of popped corn which comprises: causing air heated to a temperature whereat a syrup base edible binder is liquefied to flow during a predetermined time interval through a quantity of popped corn confined in a space at a rate sufficient to support and tumble the same, during said time interval feeding a syrup base edible binder in finely divided dry powder form and liquefiable at the temperature of the heated air into the space in an amount sufficient to coat the popped corn, shutting off the flow of air, and compressing the coated popped corn into the desired shape.

23. Continuous method of making popped corn balls which comprises: simultaneously feeding a stream of dry popped corn kernels and a stream of syrup base edible binder in finely divided dry powder form into the top portion of a mixing chamber heated to a temperature whereat said dry binder is rendered sufficiently tacky to cause the kernels of popped corn to adhere when subjected to pressure but insufficient to cause them to adhere to the walls of said chamber to any substantial extent, uniformly mixing said kernels of popped corn and dry powdered binder in said heated mixing chamber, removing said heated admixture from the bottom of said heated mixing chamber at a rate sufficient to equal the feeding rate thereinto, and promptly subjecting separate quantities of said removed heated admixture to pressure to form the same into popped corn balls.

24. The method of claim 23 wherein said stream of popped corn kernels is preheated.

25. Continuous method of making popped corn balls which comprises: repeatedly feeding a given quantity of syrup base edible binder in finely divided dry powder form into a mixing chamber containing a given quantity of dry popped corn kernels at a temperature whereat said dry binder is rendered sufficiently tacky to cause the kernels of popped corn to adhere when subjected to pressure but insufficient to cause them to adhere to the walls of said chamber to any substantial extent, uniformly mixing said kernels of popped corn and said dry powdered binder in said mixing chamber, and forming the admixture into a popped corn ball.

26. The method as set forth in claim 25 wherein the popped corn kernels are preheated.

References Cited in the file of this patent

UNITED STATES PATENTS

| | | |
|---|---|---|
| 693,631 | Tilden et al. | Feb. 18, 1902 |
| 1,233,335 | Fletcher | July 17, 1917 |
| 1,526,746 | Friedman | Feb. 17, 1925 |
| 1,757,234 | Carson | May 6, 1930 |
| 1,879,927 | Eakins | Sept. 27, 1932 |
| 2,437,150 | Berg | Sept. 16, 1944 |
| 2,451,096 | Kooman | Oct. 12, 1948 |
| 2,556,111 | Sargent | June 5, 1951 |
| 2,702,261 | Bacon et al. | Feb. 15, 1955 |
| 2,731,066 | Hogendobler et al. | Jan. 17, 1956 |